United States Patent Office 3,179,528
Patented Apr. 20, 1965

3,179,528
LOW TEMPERATURE CEMENTING
COMPOSITION
Carl R. Holmgren and William G. Bearden, Tulsa, Okla.,
assignors to Pan American Petroleum Corporation,
Tulsa, Okla., a corporation of Delaware
No Drawing. Filed Nov. 26, 1962, Ser. No. 240,151
7 Claims. (Cl. 106—90)

The present invention relates to cements suitable for use at freezing temperatures and below. More particularly, it is concerned with cements useful for both oil field and general construction purposes, and which are capable of developing good tensile strength at temperatures as low as about 15° F.

Briefly, the novel compositions of our invention employ cement-calcined gypsum mixtures in which the gypsum is present in amounts ranging from about 50 to about 75 weight percent of such mixtures. To the latter is added an aqueous solution of a suitable freezing point depressant such as a lower aliphatic alcohol, for example methanol, ethanol, isopropyl alcohol, etc. Cements of the aforesaid mixtures and solutions exhibit tensile strengths well above the 50 p.s.i. minimum required for oil fields and many kinds of general well construction work when prepared and cured at temperatures as low as 5° F. By adding glue size to these cements, it is possible to control their pumpability time over wide limits at such temperatures.

While the discussion which follows emphasizes the applicability of the compositions of our invention for use in cementing oil well casing at abnormally low surface and subsurface temperatures, it is to be understood that we also contemplate the use of our novel cements as an all-purpose construction material capable of being poured and worked at temperatures as low as about 5° to 10° F.

In parts of the world north of 50° latitude, the ground is subject to weather conditions which result in permanently frozen ground to a depth which may reach 1300 feet or more. This zone is commonly known as the "permafrost." The temperature in this zone is 10° F. to 15° F. at the depth of zero annual amplitude (50-100 feet below the surface). From this point downward the temperature gradually rises to 32° F., which is, by definition, the bottom of the permafrost. Essentially normal bottom-hole temperature gradients should exist below the permafrost.

During the drilling operation, warm circulating mud will thaw the permafrost around the well. When circulation stops, the well bore temperature is restored to a minimum; consequently, common oil well cements mixed with water may freeze before they can be placed or before adequate strength is developed. Then, when circulation is resumed, the cement is thawed and it fails.

A cementing material placed between the permafrost and casing cures under environmental conditions which might range from wet, above freezing conditions to dry, sub-freezing conditions. Also, when the hole is drilled deeper through the cemented casing, warm drilling mud again heats the cement. In many other places, sub-freezing atmospheric temperatures over long periods of time during the year result in many construction problems and surface pipe cementing problems, although the permafrost condition does not exist.

Insofar as we are aware, the cementing art prior to our invention required, during low temperature conditions, either that cementing operations be suspended until the temperature would permit natural and proper setting of the cement, or the temperature had to be increased by artificial means. For example, it has been the practice if concrete had to be poured during cold weather to build a structure over the work in progress and add heat to the enclosure by means of open fires so that the temperature of the atmosphere in contact with the cement would permit the latter to set properly without having to contend with the problem of the cement freezing before it set.

We have now developed and tested cementing compositions under conditions at least as severe as those typical of the permafrost zone and in a majority of the other freezing problem areas. These compositions use a blend of Portland cement, gypsum and an aqueous solution of a water-miscible, organic liquid, such as acetone, methanol, etc. We have prepared cement mixtures capable of developing adequate strength at about 5° F. for normal well operations.

In preparing compositions of this kind, a number of factors in addition to final strength must be considered, such as pumpability time and time required for the cement to set. The maximum pumpability time, i.e., the time to reach 100 poises consistency, of the compositions of our invention is dependent upon the bottom hole cementing temperature, the initial slurry temperature, and composition.

Increasing bottom hole cementing temperature reduces the pumpability time. In most wells bottom hole cementing temperature is a factor over which little control can be exercised. In shallow drilling under sub-freezing (permafrost) conditions, however, the bottom-hole cementing or circulating temperature is primarily governed by the temperature of the drilling fluid and since it is often necessary to heat the drilling fluid, the bottom-hole cementing temperature can be varied over a considerable range. As longer pumpability time is available at the lower cementing temperature, the temperature of the drilling fluid should be held at a minimum. For surface casing, the bottom-hole cementing temperature may be assumed equal to the average of the mud pump suction and discharge temperatures. Another advantage of keeping the temperature of the drilling fluid low is that a better bond is formed between formation and the cement as the circulation of hot mud prior to cementing will thaw the permafrost around the well such that an incompetent formation is available to which the cement can bond. Also, the use of low drilling fluid temperatures should result in a savings in fuel costs involved in heating the mud.

The initial slurry temperature was also determined to effect pumpability time. Within the range of 15° to 90° F., increasing the initial slurry temperature increased the pumpability time. Therefore, the highest slurry temperature that can be obtained, with proper regard to other factors, should be used.

Another very important factor affecting pumpability time is composition of the cementing mixture. Thus, all freezing point depressants are not operable in mixtures of the class contemplated by our invention. In establishing this factor, we tested a number of such materials with various combinations of cement mixtures and while adequate strengths in some cases were developed with certain freezing point depressants, as shown in the table below, the same materials had to be discarded because of the poor pumpability time that they imparted to the mixture.

*Table I*

| Cement/Gypsum ratio, by wgt. | Solution Used [1] | Solution/ Solids Ratio, cc./gr. | Tensile Strength, p.s.i. | |
|---|---|---|---|---|
| | | | After 72 hrs. at 13° F. | After 72 hrs. at 13° F. and 1.5 hrs. at 80° F. |
| 100% cement | MgCl₂ | .46 | 462 | 8 |
| 3:1 | MgCl₂ | .445 | 465 | 35 |
| 1:1 | MgCl₂ | .43 | 385 | 128 |
| 1:3 | MgCl₂ | .415 | 201 | 181 |
| 100% gypsum | MgCl₂ | .40 | 287 | 234 |
| 100% cement | NaCl | .46 | 8 | 1 |
| Do | Methanol | .46 | 0 | 0 |
| 3:1 | ----do---- | .46 | 32 | 23 |
| 1:1 | ----do---- | .46 | 142 | 81 |
| 1:3 | ----do---- | .46 | 251 | 186 |
| 100% gypsum | ----do---- | .40 | 44 | 53 |
| 100% cement | Ethylene Glycol | .46 | 0 | 0 |
| | Methanol+4% CaCl₂ | .46 | 0 | 1 |

[1] Concentration sufficient to give a 5° F. freezing point.

As shown in Table I, the highest strengths were observed with the blends containing a large amount of gypsum mixed with the magnesium chloride solution. However, these compositions were characterized by a very short thickening or pumpability time at 40° F. (the 1:1 cement-gypsum blend reached a 100 poises consistency in only 2 minutes) which obviously eliminated from further consideration magnesium chloride as a freezing point depressant. In the case of sodium chloride and the calcium chloride-methanol solutions, it is apparent that such mixtures were incapable of developing adequate strength. Pure gypsum, as in the case of magnesium chloride, had a much too rapid setting time. It will also be seen that a number of other antifreeze materials were of no value whatever for our purposes. An additional factor pointing out the highly empirical nature of this work concerns the particular material we use to assure setting of these alcohol-containing cement mixtures, i.e., gypsum. Both gypsum and Lumnite cement—a high alumina cement—cause cement to flash-set in the presence of sufficient moisture. If, however, alcohol is present in the water used, the gypsum-cement mixture exhibits a normal setting time, whereas Lumnite-cement mixtures still flash-set. Also, Lumnite cement and gypsum in the presence of aqueous alcohol solutions do not give a satisfactory product because of their inability to develop strength at low temperatures.

The data in the above table were also of interest in that they show what ranges of cement and gypsum are suitable to yield a mixture which in combination with alcohol is capable of developing adequate strength under low temperature conditions.

The concentration of the lower alcohol employed, however, does have an influence on the pumpability time of the mixture. For example, we have found that with a 1:1 cement-gypsum mixture at 40° F. the alcohol content of the solution used should be at least 20 volume percent, as seen in the table below. In these tests, the initial slurry temperature was 87° F.

*Table II*

| Volume percent Methanol in Mixing Water | Freezing Point, ° F. | Pumpability Time to 100 poises at 40° F., hrs: min. |
|---|---|---|
| 0 | 32 | 0:19 |
| 10 | 23 | 0:35 |
| 15 | 17 | 0:52 |
| 20 | 11 | 1:38 |
| 24.3 | 5 | 2:20 |

It will be seen that the alcohol not only lowers the freezing point of the mixture, but functions as a retarder as well. Because of this latter property it is not possible to vary the alcohol content of such mixtures without changing pumpability time. We have found, however, that within limits this restriction can be removed by adding, preferably to the dry mix of cement and gypsum, from about 0.1 to about 2 weight percent of a cereal glue pigmented size—generally in the form of a white powdery material, one type of which is sold under the name of "Prime-Rite Wall Size" by the Synkoloid Company, San Francisco, California. As pointed out in Table II, the pumpability time of the compositions of our invention decreased as the alcohol content decreased. However, the addition of glue size retards the setting time to such an extent that the pumpability time can be varied independently of the alcohol content. As a result a cement mixture can be "tailored" so that only enough alcohol need be added to lower the freezing point of the mixture to the level desired. If it so happens that this quantity of alcohol is not sufficient to give the proper pumpability time, then the latter can be lengthened merely by adding a small amount of glue size or its equivalent thereto. Ordinarily we prefer to add sufficient size to the cement mixtures of our invention so that the latter have a pumpability time of from one to three hours.

On the matter of strength development—commonly referred to as WOC (waiting on cement) time—the compositions of our invention acquire this characteristic rapidly, maximum tensile strength of 160 p.s.i. in some cases at 13° F. being obtained in about 30 hours. In eight hours at 13° F., a tensile strength of 120 p.s.i. can be developed, with strengths of 50 p.s.i. being reached at 13° F. in about two hours. In the majority of cases oil well cements developing a tensile strength less than 50 p.s.i. under such temperature conditions are undesirable. When the cement is allowed to warm up—as in the case when warm mud is circulated through the cemented casing to drill ahead—retrogression of strength is apparent for a few hours. However, strength development begins again. We have found that the maximum retrogression is about 30 percent of the cold strength. If this percentage of retrogression is applied to the cold strength at 8 hours, the result is still well above the minimum strength requirements for continuation of operations after cementing. Accordingly, with the cement mixtures of our invention a WOC time of 8 hours is generally adequate.

A composition fulfilling all of the foregoing requirements and which constitutes a preferred embodiment of our invention is shown below.

50 pounds API Class A Portland cement
50 pounds gypsum
5.15 gal. of a 24.3 volume percent solution of commercial methanol and water.

The methanol-water solution has a freezing point of 5° F. and a specific gravity of 0.97 at 60° F. It consists of 24.3 volumes of methanol in 1000 total volumes of solution. The slurry weight of the resulting blend is 15.2 pounds per gallon and the slurry volume is 1.24 cubic feet per 100 pounds of the cement-gypsum blend.

The application of our invention to construction concrete constitutes a further embodiment of considerable promise. In the series of tests 1:1 cement-gypsum mixtures with varying amounts of sand were studied to determine their compressive strengths on setting. In this work the alcohol solutions had freezing points ranging from 5° to about −20° F. The results obtained are shown in Table III below.

Table III

| Composition Cement:Gypsum:Sand | Solution/ Solids Ratio, cc./gram | F.P. of Mixing Solution, °F. | Comp. Strength, p.s.i., cured at 13±3° F. | |
|---|---|---|---|---|
| | | | 7 days | 28 days |
| 1:1:4 | .514 | 5 | 790 | 1137 |
| 1:1:6 | .50 | 5 | 702 | 987 |
| 1:1:4 | .428 | −22 | 842 | 1257 |
| 1:1:6 | .576 | −22 | 434 | 970 |

It will be apparent from a reading of the foregoing description that the compositions of our invention may be modified in numerous ways without departing from the scope thereof. In securing the desired freezing point reduction, mixtures of the various water-miscible organic liquids listed herein may be employed. The amount of freezing point depressant used should generally be only enough to give protection against freezing. Where the cementing temperature is not sufficiently below the freezing point of water to require enough alcohol or equivalent component to impart to the final mix a suitable pumpability time, a small quantity of glue size can be added to produce this characteristic in said mix in place of employing the more expensive freezing point depressant.

The term "gypsum," as used herein, is intended to mean calcined gypsum.

We claim:

1. A settable cement slurry suitable for use at freezing temperatures and below, capable of developing good tensile strength at temperatures as low as about 15° F., comprising essentially a Portland cement-calcined gypsum mixture ranging in composition from about equal parts of cement and calcined gypsum to 1 part of cement and about 3 parts of calcined gypsum, said mixture having added thereto an aqueous solution of a water-miscible, oxygenated organic solvent selected from the group consisting of acetone and alcohols, the solvent being present in an amount sufficient both to protect the cement from freezing at the curing temperature involved and to impart to the final mixture a pumpability time of from about one to three hours.

2. The composition of claim 1 in which the solvent is a water-miscible alcohol.

3. The composition of claim 2 in which the water-miscible alcohol is methanol.

4. A settable cement slurry suitable for use at freezing temperatures as low as about 15° F., comprising essentially a Portland cement-calcined gypsum mixture ranging in composition from about equal parts of cement and calcined gypsum to 1 part of cement and 3 parts of gypsum, said mixture having added thereto an aqueous solution of a water-miscible alcohol in which the latter is present in an amount sufficient to protect the cement from freezing at the curing temperature involved and having incorporated therein a sufficient quantity of cereal glue size to impart to the final mixture a pumpability time of from about one to three hours.

5. A settable cement slurry suitable for use at a temperature ranging from about the freezing point of water down to about 5° F. and capable of developing a tensile strength of at least 50 p.s.i. within a period of about 8 hours at a temperature within said range, comprising essentially a Portland cement-calcined gypsum mixture ranging in composition from about equal parts of cement and calcined gypsum to 1 part of cement and about 3 parts of calcined gypsum, said mixture having added thereto an aqueous solution of a water-miscible alcohol wherein the latter is present in a concentration suffcient to protect the cement from freezing at the curing temperature involved and a sufficient quantity of cereal glue size to impart to the final mixture a pumpability time of from about one to three hours.

6. A settable cement slurry suitable for use at freezing temperatures and below capable of developing a tensile strength of at least 50 p.s.i. within a period of 8 hours at temperatures as low as 5° F., comprising essentially a Portland cement-calcined gypsum mixture ranging in composition from about equal parts of cement and calcined gypsum to 1 part of cement and about 3 parts of calcined gypsum, said mixture having added thereto an aqueous solution of a water-miscible, oxygenated organic solvent selected from the group consisting of acetone and alcohols, the solvent being present in an amount sufficient both to protect the cement from freezing at the curing temperature involved and to impart to the final mixture a pumpability time of from about one to three hours.

7. A settable cement slurry suitable for use at freezing temperatures and below, capable of developing good tensile strength at temperatures as low as about 15° F., comprising essentially a Portland cement-calcined gypsum mixture ranging in composition from about equal parts of cement and calcined gypsum to one part of cement and about three parts of calcined gypsum, said mixture having added thereto an aqueous solution of a water-miscible, oxygenated organic solvent selected from the group consisting of acetone and alcohols, the solvent being present in an amount sufficient to protect the cement from freezing at the curing temperature involved and from about 0.1 to about 2 weight percent of a cereal glue size.

References Cited by the Examiner

UNITED STATES PATENTS

| 933,036 | 8/09 | Headson | 106—114 |
| 2,032,071 | 2/36 | Scholz | 106—92 |
| 2,310,023 | 2/43 | Gardner | 106—114 |
| 2,487,030 | 11/49 | Schustek | 106—114 |
| 2,776,713 | 1/57 | Morgan et al. | 106—90 |

OTHER REFERENCES

Taylor and Thompson: "A Treatise on Concrete Plain and Reinforced," John Wiley and Sons Inc., New York, 1917, page 287.

TOBIAS E. LEVOW, *Primary Examiner.*